(12) United States Patent
Jin et al.

(10) Patent No.: US 11,662,301 B1
(45) Date of Patent: May 30, 2023

(54) MINE DUST REAL-TIME DETECTION SYSTEM BASED ON DOUBLE-PHOTO ACOUSTIC SPECTROMETRY AND DETECTION METHOD

(71) Applicant: Anhui University of Science and Technology, Huainan (CN)

(72) Inventors: Huawei Jin, Huainan (CN); Lei Fang, Huainan (CN); Haowei Wang, Huainan (CN)

(73) Assignee: Anhui University of Science and Technology, Huainan (CN)

( * ) Notice: Subject to any disclaimer, the term of this patent is extended or adjusted under 35 U.S.C. 154(b) by 0 days.

(21) Appl. No.: 17/984,859

(22) Filed: Nov. 10, 2022

Related U.S. Application Data

(63) Continuation of application No. PCT/CN2022/087376, filed on Apr. 18, 2022.

(30) Foreign Application Priority Data

Mar. 29, 2022 (CN) .......................... 202210324718.0

(51) Int. Cl.
 *G01N 21/17* (2006.01)
 *G01N 1/24* (2006.01)
 *E21F 17/18* (2006.01)

(52) U.S. Cl.
 CPC ......... *G01N 21/1702* (2013.01); *E21F 17/18* (2013.01); *G01N 1/24* (2013.01);
 (Continued)

(58) Field of Classification Search
 CPC .............................. G01N 21/1702; G01N 1/24
 (Continued)

(56) References Cited

U.S. PATENT DOCUMENTS

2016/0274024 A1* 9/2016 Han ................... G01N 21/1702
2018/0136166 A1* 5/2018 Voinea ............... G01N 21/1702
(Continued)

FOREIGN PATENT DOCUMENTS

CN     112730185 A     4/2021
CN     214121930 U     9/2021
(Continued)

OTHER PUBLICATIONS

Flowers, B. A. et al, Atmospheric Chemistry and Physics 2010, 10, 10387-10398 (Year: 2010).*

(Continued)

*Primary Examiner* — Arlen Soderquist
(74) *Attorney, Agent, or Firm* — Westbridge IP LLC

(57) ABSTRACT

Disclosed are a mine dust real-time detection system based on double-photoacoustic spectrometry and a detection method. The mine dust real-time detection system based on double-photoacoustic spectrometry includes a first sampling unit, a first photoacoustic detection cavity, a second sampling unit, a second photoacoustic detection cavity, a signal unit and a processing unit; the first sampling unit is used for sampling in respective, the first photoacoustic detection cavity provides a photoacoustic effect field to substances sampled by the first sampling unit, the second sampling unit is used for sampling in respective, the second photoacoustic detection cavity provides the photoacoustic effect field to substances sampled by the second sampling unit, the signal unit is used for providing a laser signal, and the processing unit is used for collecting and processing a photoacoustic signal.

3 Claims, 1 Drawing Sheet

(52) U.S. Cl.
CPC ............... *G01N 2021/1704* (2013.01); *G01N 2201/06113* (2013.01)

(58) Field of Classification Search
USPC ........................................................ 436/173
See application file for complete search history.

(56) References Cited

U.S. PATENT DOCUMENTS

2021/0018430 A1\* 1/2021 Gong ................. G01N 21/1702
2021/0404949 A1\* 12/2021 Gong ................. G01N 21/1702

FOREIGN PATENT DOCUMENTS

| | | |
|---|---|---|
| EP | 1936355 A1 | 6/2008 |
| WO | 0231475 A1 | 4/2002 |

OTHER PUBLICATIONS

Utry, N. et al, Atmospheric Measurement Techniques 2015, 8, 401-410. (Year: 2015).\*

Jin, H. et al, AIP Advances 2021, 11, paper 125307, 9 pages. (Year: 2021).\*

Fu et al., Photoacoustic Combined Method Research Sensing for Methane and Coal Dust in the Mine, Chinese Journal of Sensors and Actuators, vol. 26, No. 7, pp. 922-926, dated Jul. 15, 2013.

Li et al., Principle and Applications of Double-beam Laser Photoacoustic Spectrometer of High Signal-noise Ratio, Chinese Journal of Light Scattering, vol. 15, No. 3, pp. 208-212, dated Oct. 31, 2003.

\* cited by examiner

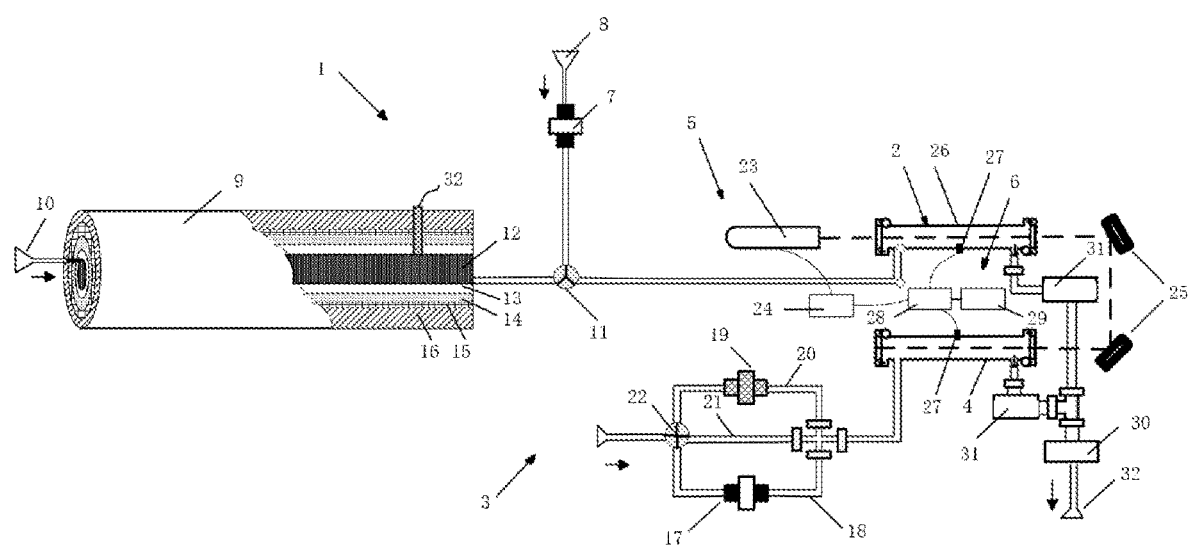

MINE DUST REAL-TIME DETECTION SYSTEM BASED ON DOUBLE-PHOTO ACOUSTIC SPECTROMETRY AND DETECTION METHOD

CROSS-REFERENCE TO RELATED APPLICATIONS

This application is a continuation of International Application No. PCT/CN2022/087376, filed on Apr. 18, 2022, which claims priority to Chinese Patent Application No. 202210324718.0, filed on Mar. 29, 2022, the entire contents of which are incorporated herein by reference.

TECHNICAL FIELD

The present disclosure relates to the technical field of mine dust detection, in particular to a mine dust real-time detection system based on double-photoacoustic spectrometry and a detection method.

BACKGROUND

Respirable dust is a main factor leading to pneumoconiosis, which is the most serious occupational disease in our country. Safety Regulations in Coal Mine stipulates that a coal mine enterprise must monitor the underground productive dust. When the free $SiO_2$ content in the dust is less than 10%, the respirable dust under the permissible concentration-time weighted average should be less than 2.5 mg/m3, and the total dust should be less than 4 mg/m3, etc. Thus, the free $SiO_2$ content in the dust is the important basis for judging whether the dust exceeds the standard, Safety Regulations in Coal Mine also stipulates that the free $SiO_2$ content in the dust must be measured every half year. $SiO_2$ floats in the coal dust air in a free and gaseous form, with less content. Most of the existing detection technologies are offline sampling, so the timeliness and accuracy have great defect, the online detection and real-time research and judgment cannot be achieved, thereby not meeting the control requirements for the respirable dust in the mine.

SUMMARY

The technical problem to be solved by the present disclosure is to provide a mine dust real-time detection system based on double-photoacoustic spectrometry and a detection method, which can perform online detection on free $SiO_2$ content, respirable dust concentration and total dust concentration in the dust.

In order to solve the above technical problem, the present disclosure adopts the following technical solution: a mine dust real-time detection system based on double-photoacoustic spectrometry includes a first sampling unit, a first photoaccoustic detection cavity, a second sampling unit, a second photoaccoustic detection cavity, a signal unit and a processing unit.

The first sampling unit is configured to sample a background and total dust in the dust in respective, the first photoaccoustic detection cavity communicates with the first sampling unit and provides a photoaccoustic effect field to substances sampled by the first sampling unit, the second sampling unit is configured to sample background interference gas in the dust, free respirable dust in the dust and total free dust in respective, the second photoaccoustic detection cavity communicates with the second sampling unit and provides the photoaccoustic effect field to substances sampled by the second sampling unit, and the second photoaccoustic detection cavity communicates with the first photoaccoustic detection cavity; and the signal unit is configured to provide a laser signal to the first photoaccoustic detection cavity and the second photoaccoustic detection cavity, and the processing unit is configured to collect and process a photoaccoustic signal generated after the photoacoustic effect.

Further, the first sampling unit includes a background CO sampling gas circuit provided with a first filtration film, a total CO sampling gas circuit provided with a reaction component capable of reacting the gaseous and free $SiO_2$ in the dust to generate solid Si and gaseous CO, and a three-way control valve; one end of the background CO sampling gas circuit, one end of the total CO sampling gas circuit and one end of the first photoaccoustic detection cavity communicate with three ports of the three-way control valve in respective, the other end of the background CO sampling gas circuit and the other end of the total CO sampling gas circuit are used for sampling in respective, and the other end of the first photoaccoustic detection cavity communicates with the second photoaccoustic detection cavity.

Further, the reaction component includes a carbon tube as well as a heating tape, a high temperature quartz felt, a high temperature quartz fiber and a high temperature resistant insulated cotton that are covered on an outer layer of the carbon tube in turn and heat the carbon tube; and one end of the carbon tube is a sampling port, and the other end of the carbon tube communicates with the total CO sampling gas circuit.

Further, the second sampling unit includes a background interference gas sampling gas circuit provided with a second filtration film, a free respirable dust sampling gas circuit provided with a 7 um metal filtration film, a total free dust sampling gas circuit and a four-way control valve, one end of the background interference gas sampling gas circuit, one end of the free respirable dust sampling gas circuit and one end of the total free dust sampling gas circuit communicate with three ports of the four-way control valve in respective, and the other end of the background interference gas sampling gas circuit, the other end of the free respirable dust sampling gas circuit and the other end of the total free dust sampling gas circuit communicate with the second photoaccoustic detection cavity in respective.

Further, the signal unit includes a laser device, a signal modulator for modulating the laser device to output a square wave modulating signal and send out a near infrared laser, and a retroreflector, through which the obtained laser can not only pass through the first photoaccoustic detection cavity, but also pass through the second photoaccoustic detection cavity.

Further, both of the first photoaccoustic detection cavity and the second photoaccoustic detection cavity include a photoaccoustic cavity and a rheomicrophone which is arranged in the middle of the photoaccoustic cavity and used for generating a photoaccoustic signal, and the two ends of the photoaccoustic cavity are all sealed through a sealing O-ring and a quartz window.

The processing unit includes a lock-in amplifier for collecting and amplifying the photoaccoustic signal generated by the rheomicrophone and a detection software for processing and displaying a signal collected by the lock-in amplifier.

Further, the mine dust real-time detection system based on double-photoacoustic spectrometry further includes a sampling pump and two flowmeters, the sampling pump is arranged between the first photoaccoustic detection cavity and the second photoaccoustic detection cavity for air exhaust, the two flowmeters are respectively arranged between the first photoaccoustic detection cavity and the sampling pump, and between the second photoaccoustic detection cavity and the sampling pump, so as to control the gas flow.

A mine dust real-time detection method based on double-photoacoustic spectrometry includes a mine dust real-time detection system based on double-photoacoustic spectrometry, and the method includes the following steps of:

S1, in a first sampling unit, regulating a three-way control valve, so that the first photoacoustic detection cavity communicates with a background CO sampling gas circuit; and in a second sampling unit, regulating a four-way control valve, so that a second photoacoustic detection cavity communicates with a background interference gas sampling gas circuit;

S2, starting a sampling pump, where in the first sampling unit, particle dust of the background CO of the dust is filtered through a first filtration film, and then the background CO enters the first photoacoustic detection cavity through the three-way control valve; and in the second sampling unit, the dust enters from the four-way control valve, and the particle dust is filtered through a second filtration film and enters the second photoacoustic detection cavity; and at this time an object to be measured entering the first photoacoustic cavity is the background CO of the dust, and an object to be measured entering the second photoacoustic detection cavity is the background interference gas of the coal dust;

S3, starting a signal modulator to modulate a laser device to send out laser, where the laser passes through the first photoacoustic detection cavity and the second photoacoustic detection cavity, in the first photoacoustic detection cavity, the laser stimulates CO gas based on a photoacoustic effect to generate a sound pressure wave section, a rheomicrophone arranged on the first photoacoustic detection cavity is driven to generate a photoacoustic signal, and after the photoacoustic signal is collected and amplified by the lock-in amplifier, the content $S_{CO\ background}$ of the background CO is displayed on a detection software; and in the second photoacoustic detection cavity, the laser stimulates the background interference gas based on the photoacoustic effect to generate the sound pressure wave section, the rheomicrophone arranged on the second photoacoustic detection cavity is driven to generate the photoacoustic signal, and after the photoacoustic signal is collected and amplified by the lock-in amplifier, the content $S_{background\ interference}$ of the background interference gas is displayed on the detection software;

S4, in the first sampling unit, regulating the three-way control valve, so that the first photoacoustic detection cavity communicates with a total CO sampling gas circuit; and in the second sampling unit, regulating the four-way control valve, so that the second photoacoustic detection cavity communicates with the free respirable dust sampling gas circuit;

S5, in the first sampling unit, the dust passing through a reaction component, where solid Si and gaseous CO are generated through the gaseous free $SiO_2$ reaction, and the gaseous CO generated through gaseous free reaction and CO in the original dust enter the first photoacoustic detection cavity through the three-way control valve; and in the second sampling unit, the dust enters the second photoacoustic detection cavity through a 7 um metal filtration film, at this time, an object to be measured entering the first photoacoustic cavity is the gaseous CO generated through gaseous free reaction and CO in the original dust, and an object to be measured entering the second photoacoustic detection cavity is the free respirable dust with interference gas;

S6, in the first photoacoustic detection cavity: same as S3 principle, the rheomicrophone on the first photoacoustic detection cavity generating a total CO photoacoustic signal, which is processed through the detection software after being collected and amplified through the lock-in amplifier; and in the second photoacoustic detection cavity: same as S3 principle, the rheomicrophone on the second photoacoustic detection cavity generating a photoacoustic signal of the free respirable dust, which is processed through the detection software after being collected and amplified through the lock-in amplifier;

S7, in the detection software: the total CO photoacoustic signal subtracting the background CO photoacoustic signal obtained in S3, so as to obtain the CO photoacoustic signal generated through the gaseous free $SiO_2$ reaction, obtain the content $S_{CO\ reaction}$ of CO generated by the gaseous free $SiO_2$ reaction through conversion, and converting the $S_{CO\ reaction}$ through a formula so as to obtain the content $S_{SiO2}$ of the gaseous free $SiO_2$; and the photoacoustic signal of the free respirable dust subtracting the photoacoustic signal of the background interference gas, so as to obtain the photoacoustic signal of the free respirable dust removing the interference gas, and obtain the content $S_{respirable\ dust}$ of the free respirable dust removing the interference gas through conversion;

S8, regulating the four-way control valve, so that the total free dust sampling gas circuit communicates with the second photoacoustic detection cavity directly, where the total free dust enters the second photoacoustic cavity through the four-way control valve, and at this time the object to be measured is the total free dust with interference gas;

S9, obtaining the photoacoustic signal of the total free dust through the photoacoustic effect, and processing the photoacoustic signal through the detection software after being collected and amplified through the lock-in amplifier;

S10, in the detection software, the photoacoustic signal of the total free dust subtracting the photoacoustic signal of the background interference gas obtained in S3, so as to obtain the photoacoustic signal of the total free dust removing the interference gas, and then obtain the content $S_{total\ dust}$ of the total free dust removing the interference gas through conversion;

S11, in the detection software, comprehensively analyzing the content $S_{SiO2}$ of the gaseous free $SiO_2$, the free respirable dust content $S_{respirable\ dust}$ and the total free dust content $S_{total\ dust}$, carrying out time weighted average, matching the requirements of the regulations in real time, and alarming and displaying in real time.

The present disclosure has the following beneficial effects:

In the present disclosure, the mine dust real-time detection system based on double-photoacoustic spectrometry is provided with the first sampling unit, the first photoacoustic detection cavity, the second sampling unit, the second photoacoustic detection cavity, the signal unit and the processing unit.

The first sampling unit can sample the background CO and the total dust CO in the dust in respective, and after being sampled, the background CO in the dust is processed through the signal unit and the first photoacoustic detection cavity, so as to obtain the photoacoustic signal of the dust background CO; and after being sampled, the total dust CO is processed through the signal unit and the first photoacoustic detection cavity, so as to obtain the photoacoustic signal of the total dust CO, the total dust CO includes CO generated through the gaseous free $SiO_2$ reaction and dust background CO, the total dust CO is processed through the processing unit, the photoacoustic signal of the total dust CO subtracts the photoacoustic signal of the background CO so as to obtain the photoacoustic signal of the CO generated through the gaseous free $SiO_2$ reaction and obtain the content of the CO generated through the gaseous free $SiO_2$ reaction, and the content of the gaseous free $SiO_2$ is calculated through the formula.

The second sampling unit can sample the background interference gas in the dust, the free respirable dust in the dust and the total free dust in respective, and after being sampled, the background interference gas is processed through the signal unit and the second photoacoustic detection cavity, so as to obtain the photoacoustic signal of the dust background interference gas. After being sampled, the free respirable dust is processed through the signal unit and the second photoacoustic detection cavity, so as to obtain the photoacoustic signal of the free respirable dust, the free respirable dust to be measured includes the background interference gas, so the photoacoustic signal of the obtained free respirable dust subtracts the photoacoustic signal of the background interference gas, so as to obtain the photoacoustic signal of the free respirable dust removing the interference gas, and then the photoacoustic signal is processed through the processing unit, so as to obtain the content of the free respirable dust removing the interference gas. After being sampled, the total free dust is processed through the signal unit and the second photoacoustic detection cavity, so as to obtain the photoacoustic signal of the total free dust, and the total free dust to be measured includes the background interference gas, so the photoacoustic signal of the obtained total free dust subtracts the photoacoustic signal of the background interference gas so as to obtain the photoacoustic signal of the total free dust removing the interference gas, and then the photoacoustic signal is processed through the processing unit, so as to obtain the content of the total free dust removing the interference gas in the dust.

The first photoacoustic detection cavity communicates with the second photoacoustic detection cavity, air exhaust is carried out between the first photoacoustic detection and the second photoacoustic detection cavity, so as to achieve simultaneous sampling and detection and synchronous research and judgment, and the problem that the respirable dust and the total dust cannot be detected quantitatively, in real-time and online is effectively solved, with a high precision and low cost.

BRIEF DESCRIPTION OF THE DRAWINGS

FIG. 1 is a structural schematic diagram of a mine dust real-time detection system based on double-photoacoustic spectrometry of the present disclosure.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. The embodiments in the present disclosure and features in the embodiments may be combined with each other without conflict. Based on the embodiments of the present disclosure, all the other embodiments obtained by those of ordinary skill in the art on the premise of not contributing creative effort should belong to the protection scope of the present disclosure.

It is to be noted that if directional indication, such as: upper, lower, left, right, front, rear, etc. is involved in the embodiments of the present disclosure, the directional indication is merely used to explain the relative position relation, movement and the like of various components under a certain special posture (as shown in the drawings); and if the special posture is changed, the directional indication will change accordingly.

In addition, if the descriptions "first" and "second" are involved in the embodiments of the present disclosure, the descriptions "first" and "second" are merely used for description, instead of being understood as indicating or implying relative importance or impliedly indicating the quantity of the showed technical features. Thus, the features defined with "first" and "second" may expressly or impliedly one or more features. In addition, the meaning of "and/or" in the text includes three parallel schemes, take "A and/or B" for example, including A scheme, or B scheme, or the scheme meeting A and B at the same time. In addition, "a plurality of" means two or above two. Thus, the technical solutions of various embodiments may be mutually combined, but must be achieved by those of ordinary skill in the art. When the combination of the technical solution has mutual contradiction or cannot be achieved, it should believe that such combination of the technical solution does not exist and does not fall in the protection range required by the present disclosure.

Referring to FIG. 1, a mine dust real-time detection system based on double-photoacoustic spectrometry provided by the present disclosure includes a first sampling unit 1, a first photoacoustic detection cavity 2, a second sampling unit 3, a second photoacoustic detection cavity 4, a signal unit 5 and a processing unit 6.

The first sampling unit 1 is configured to sample a background CO and total dust CO in the dust in respective, the first photoaccoustic detection cavity 2 communicates with the first sampling unit 1 and provides a photoacoustic effect field to substances sampled by the first sampling unit 1, the second sampling unit 3 is configured to sample background interference gas in the dust, free respirable dust in the dust and total free dust in respective, the second photoaccoustic detection cavity 4 communicates with the second sampling unit 3 and provides the photoacoustic effect field to substances sampled by the second sampling unit 3, and the second photoaccoustic detection cavity 4 communicates with the first photoaccoustic detection cavity 2; and the signal unit 5 is configured to provide a laser signal to the first photoaccoustic detection cavity 2 and the second photoaccoustic detection cavity 4, and the processing unit 6 is configured to collect and process a photoaccoustic signal generated after the photoaccoustic effect.

The mine dust real-time detection system based on double-photoacoustic spectrometry provided by the present disclosure includes the first sampling unit 1, the first photoaccoustic detection cavity 2, the second sampling unit 3, the second photoaccoustic detection cavity 4, the signal unit 5 and the processing unit 6.

The first sampling unit 1 can sample the background CO and the total dust CO in the dust in respective, and after being sampled, the background CO in the dust is processed through the signal unit 5 and the first photoaccoustic detection cavity 2, so as to obtain the photoacoustic signal of the dust background CO; and after being sampled, the total dust CO is processed through the signal unit and the first photoacoustic detection cavity 2, so as to obtain the photoacoustic signal of the total dust CO, the total dust CO includes CO generated through the gaseous free $SiO_2$ reaction and dust background CO, the total dust CO is processed through the processing unit 6, the photoacoustic signal of the total dust CO subtracts the photoacoustic signal of the background CO so as to obtain the photoacoustic signal of the CO generated through the gaseous free $SiO_2$ reaction and obtain the content of the CO generated through the gaseous free $SiO_2$ reaction, and the content of the gaseous free $SiO_2$ is calculated through a formula.

The CO generated through the gaseous free $SiO_2$ reaction can be calculated through a formula: $SiO_2+2C$=high temperature=$Si+2CO$, and the range of the high temperature is 200-500° C.

The second sampling unit 3 can sample the background interference gas in the dust, the free respirable dust in the dust and the total free dust in respective, and after being sampled, the background interference gas is processed through the signal unit 5 and the second photoacoustic detection cavity 4, so as to obtain the photoacoustic signal of the dust background interference gas. After being sampled, the free respirable dust is processed through the signal unit 5 and the second photoacoustic detection cavity 4, so as to obtain the photoacoustic signal of the free respirable dust, the free respirable dust to be measured includes the background interference gas and is processed by the processing unit 6, the photoacoustic signal of the obtained free respirable dust subtracts the photoacoustic signal of the background interference gas, so as to obtain the photoacoustic signal of the free respirable dust removing the interference gas, and obtain the content of the free respirable dust removing the interference gas. After being sampled, the total free dust is processed through the signal unit 5 and the second photoacoustic detection cavity 4, so as to obtain the photoacoustic signal of the total free dust, and the total free dust to be measured includes the background interference gas and is processed by the processing unit 6, the photoacoustic signal of the obtained total free dust subtracts the photoacoustic signal of the background interference gas so as to obtain the photoacoustic signal of the total free dust removing the interference gas, and obtain the content of the total free dust removing the interference gas.

The first photoacoustic detection cavity 2 communicates with the second photoacoustic detection cavity 4, air exhaust is carried out between the first photoacoustic detection cavity 2 and the second photoacoustic detection cavity 4, so as to achieve simultaneous sampling and detection and synchronous research and judgment, and the problem that the respirable dust and the total dust cannot be detected quantitatively, in real-time and online is effectively solved, with a high precision and low cost.

In one embodiment, the first sampling unit 1 includes a background CO sampling gas circuit 8 provided with a first filtration film 7, a total CO sampling gas circuit 10 provided with a reaction component 9 capable of reacting the gaseous and free $SiO_2$ in the dust to generate solid Si and gaseous CO, and a three-way control valve 11; one end of the background CO sampling gas circuit 8, one end of the total CO sampling gas circuit 10 and one end of the first photoacoustic detection cavity 2 communicate with three ports of the three-way control valve 11 in respective, the other end of the background CO sampling gas circuit 8 and the other end of the total CO sampling gas circuit 10 are used for sampling in respective, and the other end of the first photoacoustic detection cavity 2 communicates with the second photoacoustic detection cavity 4. In this design, the three-way control valve 11 controls the background CO sampling gas circuit 8 and the total CO sampling gas circuit 10 to communicate with the first photoacoustic detection cavity 2 in respective, thereby achieving the separate collection of the background CO sampling gas circuit 8 and the total CO sampling gas circuit 10, and then obtaining two sets of data for easy processing.

In one embodiment, the reaction component 9 includes a carbon tube 12 as well as a heating tape 13, a high temperature quartz felt 14, a high temperature quartz fiber 15 and a high temperature resistant insulated cotton 16 that are covered outside the carbon tube 12 in turn and heat the carbon tube 12; and one end of the carbon tube 12 is a sampling port, and the other end of the carbon tube 12 communicates with the total CO sampling gas circuit 10. In this design, when the dust passes through the reaction component 9, under the action of the high temperature and the carbon tube 12, the gaseous free $SiO_2$ included in the dust reacts to generate solid Si and gaseous $COSiO_2+2C$=high temperature=$Si+2CO$, where the high temperature range is 200-500° C., and the reaction component 9 in this embodiment further includes an internal temperature probe 32 for controlling the temperature, so the temperature in the reaction component 9 is convenient to control.

In one embodiment, the second sampling unit 3 includes a background interference gas sampling gas circuit 18 provided with a second filtration film 17, a free respirable dust sampling gas circuit 20 provided with a 7 um metal filtration film 19, a total free dust sampling gas circuit 21 and a four-way control valve 22, one end of the background interference gas sampling gas circuit 18, one end of the free respirable dust sampling gas circuit 20 and one end of the total free dust sampling gas circuit 21 communicate with three ports of the four-way control valve 22 in respective, and the other end of the background interference gas sampling gas circuit 18, the other end of the free respirable dust sampling gas circuit 20 and the other end of the total free dust sampling gas circuit 21 communicate with the second photoacoustic detection cavity 4 in respective. In this design, the four-way control valve 22 controls the background interference gas sampling gas circuit 18, the free respirable dust sampling gas circuit 20 and the total free dust sampling gas circuit 21 to communicate with the second photoacoustic detection cavity 4 in respective, thereby achieving the separate collection of the three gas circuits, and then obtaining three sets of data for easy processing.

In one embodiment, the signal unit 5 includes a laser device 23, a signal modulator 24 for modulating the laser device 23 to output a square wave modulating signal and send out a near infrared laser, and a retroreflector 25, through which the obtained laser can not only pass through the first photoacoustic detection cavity 2, but also pass through the second photoacoustic detection cavity 4. In this embodiment, the first photoacoustic detection cavity 2 and the second photoacoustic detection cavity 4 are arranged in parallel, two retroreflectors 25 are provided, the laser device 23 is arranged on one side of the first photoacoustic detection cavity 2, one retroreflector 25 is arranged on the other side of the first photoacoustic detection cavity 2, the retroreflector 25 on the other side is arranged below the first retroreflector 25 and one side of the second photoacoustic detection cavity 4, and the laser of the laser device 23 can enter the second photoacoustic detection cavity 4 through the reflection of the first photoacoustic detection cavity 2 and the two retroreflectors 25. Through this design, the photoacoustic effect can be simultaneously generated inside the first photoaccoustic detection cavity 2 and the second photoaccoustic detection cavity 4, so as to carry out the synchronous detection. In this embodiment, the detection object of the first photoaccoustic detection cavity 2 is CO gas, which is detected through the laser device 23 and an intermediate infrared laser with a wave section of 2.3 um and obtained through modulation. A CO absorption cross section at 4300.699 cm-1 is selected as a sensing target, so as to obtain the photoaccoustic effect data; and however the detection object in the second photoaccoustic detection cavity is the dust, and without the absorption cross section, the dust can adopt the near infrared laser in any wave section to generate the photoaccoustic effect.

In one embodiment, both of the first photoaccoustic detection cavity 2 and the second photoaccoustic detection cavity 4 include a photoaccoustic cavity 26 and a rheomicrophone 27 which is arranged in the middle of the photoaccoustic cavity 26 and used for generating a photoaccoustic signal, and the two ends of the photoaccoustic cavity 26 are all sealed through a sealing O-ring and a quartz window.

The processing unit 6 includes a lock-in amplifier 28 for collecting and amplifying the photoaccoustic signal generated by the rheomicrophone 27 and a detection software 29 for processing and displaying a signal collected by the lock-in amplifier 28. In this embodiment, the middle of the photoaccoustic cavity 26 is a reaction area, the two ends of the photoaccoustic cavity 26 are buffer areas, and the laser enters the reaction area through quartz windows at the two ends. In the first photoaccoustic detection cavity 2, the laser stimulates the CO gas based on the photoaccoustic effect, so as to generate a sound pressure wave section, the rheomicrophone 27 arranged in the middle of the cavity is driven to generate the photoaccoustic signal. In the first photoaccoustic detection cavity 2, similarly, the rheomicrophone 27 generates the photoaccoustic signal, the photoaccoustic signals generated by the two rheomicrophones 27 are displayed through the detection software 29 after being amplified and collected through the lock-in amplifier 28, where the lock-in amplifier 28 is set to the state capable of collecting the photoaccoustic signal generated by the two rheomicrophones 27 through the signal modulator 24 in advance.

In one embodiment, the mine dust real-time detection system based on double-photoaccoustic spectrometry further includes a sampling pump 30 and two flowmeters 31, the sampling pump 30 is arranged between the first photoaccoustic detection cavity 2 and the second photoaccoustic detection cavity 4 for air exhaust, the two flowmeters 31 are respectively arranged between the first photoaccoustic detection cavity 2 and the sampling pump 30, and between the second photoaccoustic detection cavity 4 and the sampling pump 30, so as to control the gas flow. In this design, the first sampling unit 1 and the second sampling unit 3 can implement collection at the same time during air exhaust through the sampling pump 30, and the specific collection object is respectively controlled through the three-way control valve 11 and the four-way control valve 22.

A mine dust real-time detection method based on double-photoaccoustic spectrometry includes a mine dust real-time detection system based on double-photoaccoustic spectrometry, and the method includes the following steps of:

S1, in a first sampling unit 1, regulating a three-way control valve 11, so that a first photoaccoustic detection cavity 2 communicates with the background CO sampling gas circuit 8; and in a second sampling unit 3, regulating a four-way control valve 22, so that a second photoaccoustic detection cavity 4 communicates with a background interference gas sampling gas circuit 18;

S2, starting a sampling pump 30, where in the first sampling unit 1, particle dust of the background CO of the dust is filtered through a first filtration film 7, and then the background CO enters the first photoaccoustic detection cavity 2 through the three-way control valve 11; and in the second sampling unit 3, the dust enters from the four-way control valve 22, and the particle dust is filtered through a second filtration film 17 and enters the second photoaccoustic detection cavity 4; and at this time an object to be measured entering the first photoaccoustic cavity 2 is the background CO of the dust, and an object to be measured entering the second photoaccoustic detection cavity 4 is the background interference gas of the coal dust;

S3, starting a signal modulator 24 to modulate a laser device 23 to send out laser, where the laser passes through the first photoaccoustic detection cavity 2 and the second photoaccoustic detection cavity 4, in the first photoaccoustic detection cavity 2, the laser stimulates CO gas based on a photoaccoustic effect to generate a sound pressure wave section, a rheomicrophone 27 arranged on the first photoaccoustic detection cavity 2 is driven to generate a photoaccoustic signal, and after the photoaccoustic signal is collected and amplified by the lock-in amplifier 28, the content $S_{CO\ background}$ of the background CO is displayed on a detection software 29; and in the second photoaccoustic detection cavity 4, the laser stimulates the background interference gas based on the photoaccoustic effect to generate the sound pressure wave section, the rheomicrophone 27 arranged on the second photoaccoustic detection cavity 4 is driven to generate the photoaccoustic signal, and after the photoaccoustic signal is collected and amplified by the lock-in amplifier 28, the content $S_{background\ interference}$ of the background interference gas is displayed on the detection software 29;

S4, in the first sampling unit 1, regulating the three-way control valve 11, so that the first photoaccoustic detection cavity 2 communicates with a total CO sampling gas circuit 10; and in the second sampling unit 3, regulating the four-way control valve 22, so that the second photoaccoustic detection cavity 4 communicates with the free respirable dust sampling gas circuit 20;

S5, in the first sampling unit 1, the dust passing through a reaction component 9, where solid Si and gaseous CO are generated through the gaseous free $SiO_2$ reaction, and the gaseous CO generated through gaseous free reaction and CO in the original dust enter the first photoaccoustic detection cavity 2 through the three-way control valve 11; and in the second sampling unit 3, the dust enters the second photoaccoustic detection cavity 4 through a 7 um metal filtration film 19, at this time, an object to be measured entering the first photoaccoustic cavity 2 is the gaseous CO generated through gaseous free reaction and CO in the original dust, and an object to be measured entering the second photoaccoustic detection cavity 4 is the free respirable dust with interference gas;

S6, in the first photoaccoustic detection cavity 2: same as S3 principle, the rheomicrophone 27 on the first photoaccoustic detection cavity 2 generating a total CO photoaccoustic signal, which is processed through the detection software 29 after being collected and amplified through the lock-in amplifier 28; and in the second photoaccoustic detection cavity 4: same as S3 principle, the rheomicrophone 27 on the second photoaccoustic detection cavity 4 generating a photoaccoustic signal of the free respirable dust, which is processed through the detection software 29 after being collected and amplified through the lock-in amplifier 28;

S7, in the detection software 29: the total CO photoacoustic signal subtracting the background CO photoacoustic signal obtained in S3, so as to obtain the CO photoacoustic signal generated through the gaseous free $SiO_2$ reaction, obtain the content $S_{CO\ reaction}$ of CO generated by the gaseous free $SiO_2$ reaction through conversion, and converting the $S_{CO\ reaction}$ through a formula so as to obtain the content $S_{SiO2}$ of the gaseous free $SiO_2$; and the photoacoustic signal of the free respirable dust subtracting the photoacoustic signal of the background interference gas, so as to obtain the photoacoustic signal of the free respirable dust removing the interference gas, and obtain the content $S_{respirable\ dust}$ of the free respirable dust removing the interference gas through conversion; and this step can be calculated through the formula $SiO_2+2C$=high temperature=$Si+2CO$, and the high temperature range is 200-500° C.;

S8, regulating the four-way control valve 22, so that the total free dust sampling gas circuit 21 communicates with the second photoacoustic detection cavity 4 directly, where the total free dust enters the second photoacoustic cavity 26 through the four-way control valve, and at this time the object to be measured is the total free dust with interference gas;

S9, obtaining the photoacoustic signal of the total free dust through the photoacoustic effect, and processing the photoacoustic signal through the detection software 29 after being collected and amplified through the lock-in amplifier 28;

S10, in the detection software 29, the photoacoustic signal of the total free dust subtracting the photoacoustic signal of the background interference gas obtained in S3, so as to obtain the photoacoustic signal of the total free dust removing the interference gas, and then obtain the content $S_{total\ dust}$ of the total free dust through conversion;

S11, in the detection software 29, comprehensively analyzing the content $S_{SiO2}$ of the gaseous free $SiO_2$, the free respirable dust content $S_{respirable\ dust}$ and the total free dust content $S_{total\ dust}$, carrying out time weighted average, matching the requirements of the regulations in real time, and alarming and displaying in real time.

It should be understood that the examples and implementation modes of the present disclosure are merely for description, not intended to limit the present disclosure. Those skilled in the art can make various modifications or changes, and any modifications, equivalent replacements, improvements and the like made within the spirit and principle of the present disclosure shall fall within the protection scope of the present disclosure.

What is claimed is:

1. A mine dust real-time detection system based on double-photoacoustic spectrometry, comprising a first sampling unit, a first photoaccoustic detection cavity, a second sampling unit, a second photoaccoustic detection cavity, a signal unit and a processing unit;

the first sampling unit comprises a background CO sampling gas circuit provided with a first filtration film, a total CO sampling gas circuit provided with a reaction component capable of reacting gaseous and free $SiO_2$ in the dust to generate solid Si and gaseous CO, and a three-way control valve; one end of the background CO sampling gas circuit, one end of the total CO sampling gas circuit and one end of the first photoaccoustic detection cavity communicate with three ports of the three-way control valve in respective, the other end of the background CO sampling gas circuit and the other end of the total CO sampling gas circuit are used for sampling in respective, and the other end of the first photoaccoustic detection cavity communicates with the second photoaccoustic detection cavity ;

the reaction component comprises a carbon tube as well as a heating tape, a high temperature quartz felt, a high temperature quartz fiber and a high temperature resistant insulated cotton that are covered on an outer layer of the carbon tube in turn and heat the carbon tube; and one end of the carbon tube is a sampling port, and the other end of the carbon tube communicates with the total CO sampling gas circuit;

the second sampling unit comprises a background interference gas sampling gas circuit provided with a second filtration film, a free respirable dust sampling gas circuit provided with a 7 um metal filtration film, a total free dust sampling gas circuit and a four-way control valve, one end of the background interference gas sampling gas circuit, one end of the free respirable dust sampling gas circuit and one end of the total free dust sampling gas circuit communicate with three ports of the four-way control valve in respective, and the other end of the background interference gas sampling gas circuit, the other end of the free respirable dust sampling gas circuit and the other end of the total free dust sampling gas circuit communicate with the second photoaccoustic detection cavity in respective;

the signal unit comprises a laser device, a signal modulator for modulating the laser device to output a square wave modulating signal and send out a near infrared laser, and a retroreflector, through which the obtained laser is not only capable of passing through the first photoaccoustic detection cavity, but also passing through the second photoaccoustic detection cavity;

the first photoaccoustic detection cavity comprises a first photoaccoustic cavity and a first rheomicrophone which is arranged in the middle of the first photoaccoustic cavity and used for generating a photoaccoustic signal, the second photoaccoustic detection cavity comprises a second photoaccoustic cavity and a second rheomicrophone which is arranged in the middle of the second photoaccoustic cavity and used for generating a photoaccoustic signal, and the two ends of the first photoaccoustic cavity and the two ends of the second photoaccoustic cavity are all sealed through sealing O-rings and quartz windows;

the processing unit comprises a lock-in amplifier for collecting and amplifying the photoaccoustic signals generated by the first rheomicrophone and the second rheomicrophone, and a detection software for processing and displaying a signal obtained by the lock-in amplifier; and the first sampling unit is configured to sample the background CO and total dust CO in the dust in respective, the first photoaccoustic detection cavity communicates with the first sampling unit and provides a photoaccoustic effect field to substances sampled by the first sampling unit, the second sampling unit is configured to sample background interference gas in the dust, free respirable dust in the dust and total free dust in respective, the second photoaccoustic detection cavity communicates with the second sampling unit and provides the photoaccoustic effect field to substances sampled by the second sampling unit, and the second photoaccoustic detection cavity communicates with the first photoaccoustic detection cavity; and the signal unit is configured to provide laser signals to the first photoaccoustic detection cavity and the second photoacoustic detection cavity, and the processing unit is configured to collect and process the photoacoustic signal generated after the photoaccoustic effect.

2. The mine dust real-time detection system based on double-photoacoustic spectrometry according to claim 1, further comprising a sampling pump, a first flowmeter and a second flowmeter, wherein the sampling pump is arranged between the first photoaccoustic detection cavity and the second photoaccoustic detection cavity for air exhaust, the first flowmeter is arranged between the first photoaccoustic detection cavity and the sampling pump, and the second flowmeter is arranged between the second photoaccoustic detection cavity and the sampling pump, so as to control the gas flow.

3. A mine dust real-time detection method based on double-photoacoustic spectrometry applied to a mine dust real-time detection system based on double-photoacoustic spectrometry in claim 1, comprising:

S1, in a first sampling unit, regulating a three-way control valve, so that a first photoacoustic detection cavity communicates with a background CO sampling gas circuit; and in a second sampling unit, regulating a four-way control valve, so that a second photoacoustic detection cavity communicates with a background interference gas sampling gas circuit;

S2, starting a sampling pump, wherein in the first sampling unit, particle dust of the background CO of the dust is filtered through a first filtration film, and then the background CO enters the first photoacoustic detection cavity through the three-way control valve; and in the second sampling unit, the dust enters from a four-way control valve, and the particle dust is filtered through a second filtration film and enters the second photoacoustic detection cavity; and at this time an object to be measured entering the first photoacoustic cavity is the background CO of the dust, and an object to be measured entering the second photoacoustic detection cavity is the background interference gas of the coal dust;

S3, starting a signal modulator to modulate a laser device to send out laser, wherein the laser passes through the first photoacoustic detection cavity and the second photoacoustic detection cavity, and in the first photoacoustic detection cavity: the laser stimulates CO gas based on a photoacoustic effect to generate a sound pressure wave section and drive a first rheomicrophone to generate a photoacoustic signal, and after the photoacoustic signal is collected and amplified by a lock-in amplifier, the content $S_{CO\ background}$ of the background CO is displayed on a detection software; and in the second photoacoustic detection cavity: the laser stimulates the background interference gas based on the photoacoustic effect to generate the sound pressure wave section and drive a second rheomicrophone to generate the photoacoustic signal, and after the photoacoustic signal is collected and amplified by the lock-in amplifier, the content $S_{background\ interference}$ of the background interference gas is displayed on the detection software;

S4, in the first sampling unit, regulating the three-way control valve, so that the first photoacoustic detection cavity communicates with a total CO sampling gas circuit; and in the second sampling unit, regulating the four-way control valve, so that the second photoacoustic detection cavity communicates with the free respirable dust sampling gas circuit;

S5, in the first sampling unit: the dust passing through a reaction component, wherein solid Si and gaseous CO are generated through the gaseous free $SiO_2$ reaction, and the gaseous CO generated through gaseous free reaction and CO in the original dust enter the first photoacoustic detection cavity through the three-way control valve; and in the second sampling unit: the dust entering the second photoacoustic detection cavity through a 7 um metal filtration film; and at this time an object to be measured entering the first photoacoustic detection cavity is the gaseous CO generated through gaseous free reaction and CO in the original dust, and an object to be measured entering the second photoacoustic detection cavity is the free respirable dust with interference gas;

S6, in the first photoacoustic detection cavity: the first rheomicrophone generating a total CO photoacoustic signal, which is processed through the detection software after being collected and amplified through the lock-in amplifier; and in the second photoacoustic detection cavity: the second rheomicrophone generating a photoacoustic signal of the free respirable dust, which is processed through the detection software after being collected and amplified through the lock-in amplifier;

S7, in the detection software: the total CO photoacoustic signal subtracting the background CO photoacoustic signal obtained in S3, so as to obtain the CO photoacoustic signal generated through the gaseous free $SiO_2$ reaction, obtain the content $S_{CO\ reaction}$ of CO generated by the gaseous free $SiO_2$ reaction through conversion, and converting the $S_{CO\ reaction}$ through a formula so as to obtain the content $S_{SiO2}$ of the gaseous free $SiO_2$; and the photoacoustic signal of the free respirable dust subtracting the photoacoustic signal of the background interference gas, so as to obtain the photoacoustic signal of the free respirable dust removing the interference gas, and obtain the content $S_{respirable\ dust}$ of the free respirable dust removing the interference gas through conversion;

S8, regulating the four-way control valve, so that the total free dust sampling gas circuit communicates with the second photoacoustic detection cavity directly, wherein the total free dust enters the second photoacoustic detection cavity through the four-way control valve, and at this time an object to be measured is the total free dust with interference gas;

S9, obtaining the photoacoustic signal of the total free dust through a photoacoustic effect, and processing the photoacoustic signal through the detection software after being collected and amplified through the lock-in amplifier;

S10, in the detection software: the photoacoustic signal of the total free dust subtracting the photoacoustic signal of the background interference gas obtained in S3, so as to obtain the photoacoustic signal of the total free dust removing the interference gas, and then obtain the content $S_{total\ dust}$ of the total free dust removing the interference gas through conversion; and S11, in the detection software, comprehensively analyzing the content $S_{SiO2}$ of the gaseous free $SiO_2$, the free respirable dust content $S_{respirable\ dust}$ and the total free dust content $S_{total\ dust}$, carrying out time weighted average, matching the requirements of the regulations in real time, and alarming and displaying in real time.

* * * * *